UNITED STATES PATENT OFFICE.

LOUIS COLLARDON, OF LEIPZIG, GERMANY.

MANUFACTURE OF PLASTIC MASSES.

953,319.　　　　　　Specification of Letters Patent.　　Patented Mar. 29, 1910.

No Drawing.　　　Application filed January 9, 1907.　Serial No. 351,533.

*To all whom it may concern:*

Be it known that I, LOUIS COLLARDON, a citizen of Argentina, residing at 32 Friedrich-List Strasse, Leipzig, Kingdom of Saxony, German Empire, have invented certain new and useful Improvements in the Manufacture of Plastic Masses, of which the following is a specification.

The present invention relates to the manufacture of plastic masses from cellulose and cork, leather, wood meal, wool, animal hairs or other animal or vegetable fibers.

The object of the invention is to make masses especially capable of resisting a polishing action.

Cork, leather and wool wastes from clothing manufactures and finishing establishments are especially suited for carrying out my process.

Wood, cork, leather and the like are comminuted and disintegrated and are mixed with a solution of cellulose which serves as a binding means. The mixture may be effected in a mixing or kneading apparatus, whereby a heating by means of vapor or the like may be used. The solution of cellulose may be obtained by dissolving cellulose in an acid zinc chlorid solution or in ammoniacal cupric-oxid or by treating cellulose with caustic soda and dissolving the cellulose thus treated in oxid of copper. Viscose with or without water may also be used as binding means. If the cellulose solutions are highly alkaline, weak organic acids, bisulfite liquor, solutions of metallic sulfates or chlorids are added thereto until a nearly neutral reaction is obtained. The cellulose solutions after having been mixed with wool, cotton, animal hairs, wood meal or textile fibers are pressed in molds at ordinary temperature or at about 50 to 60 degrees centigrade and are then dried in the molds. The mass may also be passed between rollers (preferably heated to 50 or 60 degrees centigrade) dried in the heat and then heated to 100 or 110 degrees centigrade. A water proof mass is obtained in which the textile fibers are felted. The mass is so coherent that it may be used as a substitute for felt, leather or cork.

Mixtures of several fibers, such as mixtures of cork, leather, fibers, animal hairs and cork-meal may also be employed, in particular for polishing purposes.

In order to render the binding means permanently elastic, glycerin, acetates of glycerin, Turkey red, oil etc. may be added. Cementing substances such as dextrin, starch and potato meal may also be added.

The following mixtures have been found suitable:

1. 1 kilogram of cellulose treated with caustic soda or hydrocellulose is completely dissolved in 2 kilograms of hydrochloric acid and 1 kilogram of zinc chlorid (aluminium chlorid, magnesium chlorid) and ½ kilogram of starch of the consistency of paste is added to the said mixture. The starch may also be dissolved in a weak caustic soda solution and mixed with the cellulose solution until a neutral reaction takes place. 1 kilogram of the binding means, obtained in the aforesaid manner, is mixed with 6 to 10 kilograms of leather (or mixtures of leather, cork and hairs or hair alone), then pressed at ordinary temperature or in heat and then dried in the mold. The mixture is allowed to stand in the molds until the cellulose from the cellulose solutions has been separated.

2. 1 kilogram of potato starch is converted into a paste with 10 kilograms of 5 percentage caustic soda solution and mixed with such an amount of the acid cellulose solutions quoted under 1 that a neutral reaction is nearly or completely obtained. Then leather or the like is added in the proportion quoted in 1 and the mass is mixed in a mixing or kneading apparatus.

The obtained products are more or less elastic and flexible, according to how much of the binding means is used.

Products similar to felt or linoleum or similar to hard india rubber or sole leather may be produced by this process. The higher the proportion of viscose the harder the product will be.

What I claim as my invention and desire to secure by Letters Patent is:

1. The process for manufacturing plastic masses capable of resisting polishing actions which consists in mixing comminuted organic fibers with non-alkaline solutions of cellulose.

2. The process for manufacturing plastic masses capable of resisting polishing actions which consists in mixing comminuted organic fibers with non-alkaline solutions of cellulose, and subjecting the said mixture to pressure.

3. The process for manufacturing plastic masses capable of resisting polishing actions which consists in mixing comminuted organic fibers with non-alkaline solutions of cellulose and cementing substances and subjecting the said mixture to pressure.

4. The process for manufacturing plastic masses capable of resisting polishing actions which consists in mixing comminuted organic fibers with non-alkaline solutions of cellulose, then pressing the mixture and then drying the mixture.

In witness whereof I have hereunto signed my name this 8th day of December 1906, in the presence of two subscribing witnesses.

LOUIS COLLARDON.

Witnesses:
    RUDOLPH FRICKE,
    SOUTHARD P. WARNER.